United States Patent [19]

Schwarz

[11] 3,862,771
[45] Jan. 28, 1975

[54] ELECTRICALLY INSULATING TUBE COUPLING

[76] Inventor: Walter Schwarz, Engerthstrasse 237 B, Vienna 2, Austria

[22] Filed: Apr. 18, 1973

[21] Appl. No.: 352,279

[52] U.S. Cl.................... 285/54, 285/231, 285/374
[51] Int. Cl. ..... F16l 11/12, F16l 17/00, F16l 21/00
[58] Field of Search ............. 285/54, 231, 232, 233, 285/234, 374, 375

[56] References Cited
UNITED STATES PATENTS

| 1,986,357 | 1/1935 | Perry .................................. 285/54 |
| 3,503,633 | 3/1970 | Braun et al. .......................... 285/54 |
| 3,734,546 | 5/1973 | Herbert et al. ....................... 285/54 |

*Primary Examiner*—Patrick D. Lawson
*Attorney, Agent, or Firm*—Kinzer, Plyer, Dorn & McEachran

[57] ABSTRACT

An electrictally insulating pipe coupling for coupling metal pipes having a hollow electrically insulating coupling member extending between the pipes in such away that no overlap occures between metal parts of the pipes or coupling. A stressing arrangement is provided with abutment means for bearing on bearing surfaces of the coupling to force the coupling lightly into sockets on the coupling.

38 Claims, 16 Drawing Figures

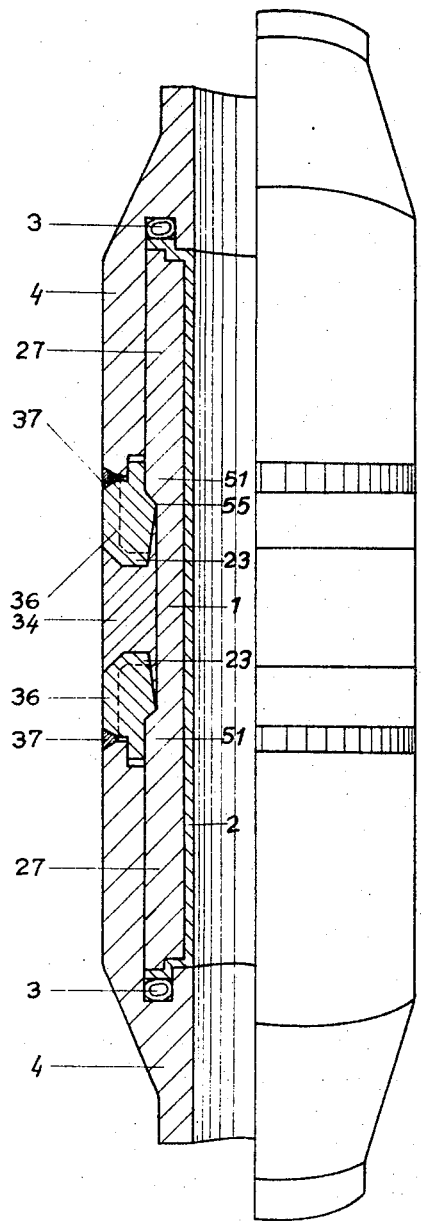
Fig. 6
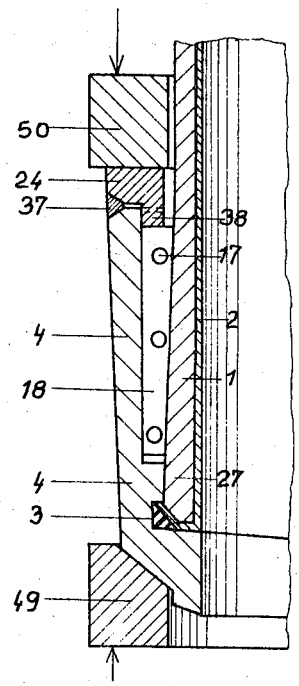
Fig. 7
Fig. 8
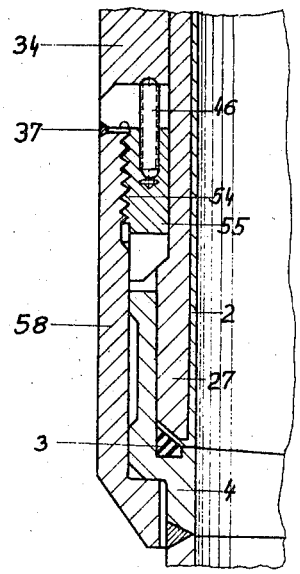

ELECTRICALLY INSULATING TUBE COUPLING

The invention relates to an electrically insulating pipe coupling for pipes of electrically conductive material, for example iron or steel and comprising connection pipes and a single tubular coupling member of plastics which may be reinforced with inserts.

The invention may be applied to a coupling for joining two pipes together end-to-end and in axial alignment, or to a coupling providing an interconnection between a number of pipes extending away in different directions.

In accordance with the present invention an electrically insulating pipe coupling has two spaced pipe connections, a hollow electrically insulating coupling member extending between the pipe connections each of which provides a socket member for receiving a hollow spigot formed on the coupling member, an external annular bearing surface formed on the coupling member and spaced back from the end rim of the spigot, a stressing arrangement arranged to be guided axially by the socket member and provided with abutment means for bearing on the annular bearing surface of the coupling member to force the spigot tightly into the socket member, and elements facilitating the rigid attachment of the stressing arrangement to the socket member after the spigot rim has been forced into sealing engagement with a sealing surface at the end of the socket.

Preferably the parts of the coupling, apart from the coupling member, are made of metal, for example iron or steel, which can readily be attached by welding to the pipes to be joined by the coupling. The pipe connectionss in this case are suitably formed as pipe sections which are integrally formed at one end, which is of larger diameter, with the socket to receive the coupling member spigot.

Different methods of production may be employed for making the insulating coupling member. It may consist of a synthetic resin, generally a thermo-setting synthetic resin, for example a cycloaliphatic epoxy resin, containing reinforcement such as pyrolyzed polyacrylonitrile fibres, glass fibres or boron fibres in which boron is deposited on an endless glass filament.

The coupling member may be parted off from a pipe length which is produced in known manner by coiling impregnated filaments on a mandrel or by impregnation, preferably in vacuum, with synthetic resin and curing thereof.

The coupling member may also be cast in known manner from a casting resin to which reinforcing fibres are added in the form of monocrystals of substances such as silicon carbide and silicon nitride.

The coupling member may also be produced from thermo-setting plastics and reinforcing materials.

The invention will now be described in more detail, by way of examples, with reference to the accompanying partly diagrammatic drawiwgs, in which:

FIG. 6 is a further embodiment of coupling shown in longitudinal side elevation and section;

FIG. 7 shows one end of a form of coupling in longitudinal section with compression rings for assisting assembly;

FIG. 8 shows one end of form of coupling in longitudinal section with a radially and axially adjustable olive divided into at least two parts;

In the following description parts having the same function in different embodiments are, in most cases, identified with the same reference numerals so that detailed description of all of the features of all of the embodiments is avoided.

Figure 1:
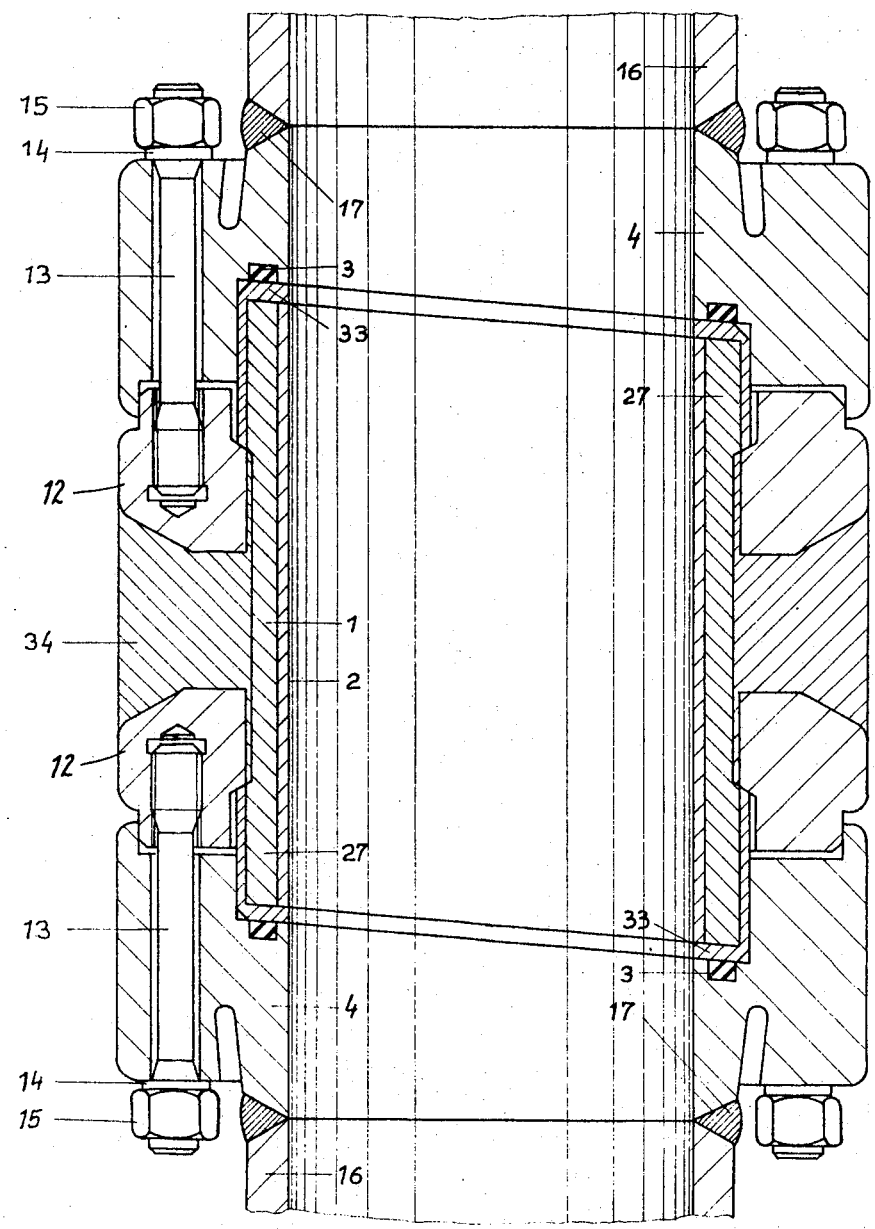
FIG. 1 shows a pipe coupling in longitudinal section.

The electrically insulating pipe coupling according to FIG. 1 comprises two pipe joints, only one of which is shown, which are symmetrical relative to a radial median plane and each having a pipe section 16 which is integral with a a socket 4.

The interior of the coupling member 1, produced by coiling resin-impregnated fibres followed by curing, is covered with a protective layer 2 which is also provided on the coupling member abutment surfaces, depending on the design of the seal provided at this position. This protective layer is preferably a film of polytetrafluorethylene.

A stressing member is constructed as a stressing flange 12. Two stressing flanges are therefore required to construct the pipe coupling, the internal diameter of said flanges being less than the external diameter of the annular beads 27 of the coupling member 1 thus requiring the stressing flanges to be enclosed between the annular beads 27 when the coupling member 1 is manufactured. It is however also possible to assemble the said stressing flanges in known manner from a plurality of parts.

This embodiment may be used for high pressures and for pipelines with large nominal bores.

In this case the socket 4 is constructed as flanged coupler which is capable of being joined to a pipe 16 by means of a circumferential welding seam 17. The ends of the coupling member 1 are cut along a plane which is inclined at an angle relative to the axis of symmetry and the ends are covered with protective sleeves 33 of steel. Each of the stressing members, constructed as a stressing flange 12, is stressed to the flanged coupler providing the socket 4, by means of bolts 13 provided with nuts 15 and lock washers 14.

The coupling member 1, in this case capable of withstanding a bursting pressure in excess of 1,000 atm gauge and surpassing the insulating capacity of intermediate members of known pipe couplings by a multiple, is preferably produced by cross-ply or helical lapping of fibres on a core, coated internally with a protective film 2, followed by impregnation with a synthetic resin and curing in known manner whereupon the protective sleeves 33 are shrunk on to the ends of the coupling member.

The middle part of the pipe coupling is covered with a protective sheath 34. The latter is constructed of a material which is softer than that of the coupling member 1, for example of a foam substance which also fills the cavities 7 of the union nut 6.

The protective sheath 34 not only has an additional insulating effect but also functions as mechanical protection for the coupling member 1 because in the event of damage the sheath completely absorbs the deformation work and does not transmit it to the coupling member 1. A mixture of bitumen and of an ethylene copolymer may be mentioned as a material suitable for the protective sheath.

The coupling member produced in this way withstands loadings in high-pressure pipelines and has an insulating effect proportional to the bridged and filled distance between the stressing flanges 12.

Figure 2:
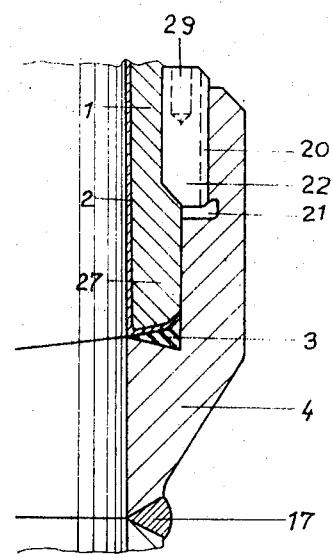
FIG. 2 shows a part of a second embodiment with an undivided clamping screw ring.

A modification of a coupling is illustrated in FIG. 2. In this case compression rings 22 are located on the coupling member 1 during its production and the production of the annular beads 27, the compression rings being tightened in a threaded annulus 20 in the socket 4 by means of a rotary driver tool which engages in bores 29 to tighten the compression ring and thrust the end of the coupling member against the seal 3, inserted into the radial groove which is of cuncform cross-section. This embodiment is particularly suitable for pipelines having small nominal bores and being subjected to slight pressure.

Figure 4:
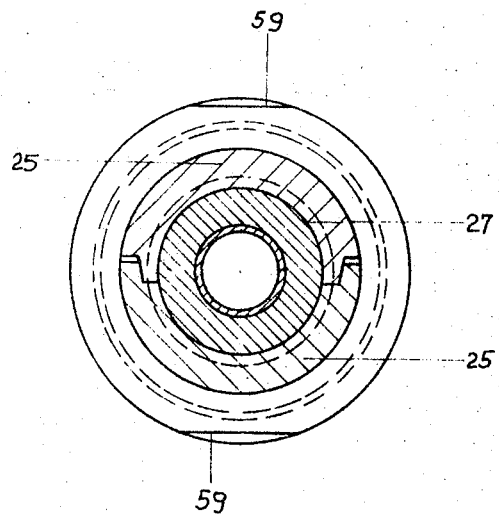
FIG. 4 is a section along the line VI—VI of FIG. 3, and the direction indicated by the arrows.
Figure 3:
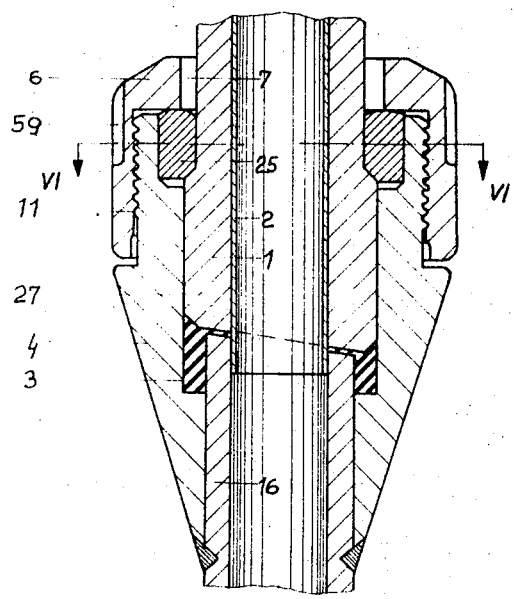
FIG. 3 shows in section one end of a third form of pipe coupling having a clamping ring divided into at least two parts.

FIG. 3 illustrates a pipe coupling for pipelines with a medium-sized nominal bore, subjected to high pressure. The socket 4 is fitted over a pipe section 16, and is welded to it. A gap 4 is provided in the interior of th socket 4 for the seal 3. The seal preferably comprises a mixture of a polyester with a urethane resin, cast into the annular chamber provided by the gap. The annular bead 27 of the coupling member 1 is stressed through the union nut 6 against the seal 3 by the divided olive 25, the parting division of which is shown more clearly in FIG. 4. The union nut 6 has a bore 7 which enables it to be drawn over the annular bead 27 of the coupling member 1. The union nut 6 is heated and screwed while hot on a buttress screwthread 11 by means of an open-ended spanner which is applied to the surfaces 59. Subsequent shrinkage of the nut 6 as it cools locks it in position. Loosening of the screwed on nut is thereafter not possible if shrinking is correctly performed.

Figure 5:
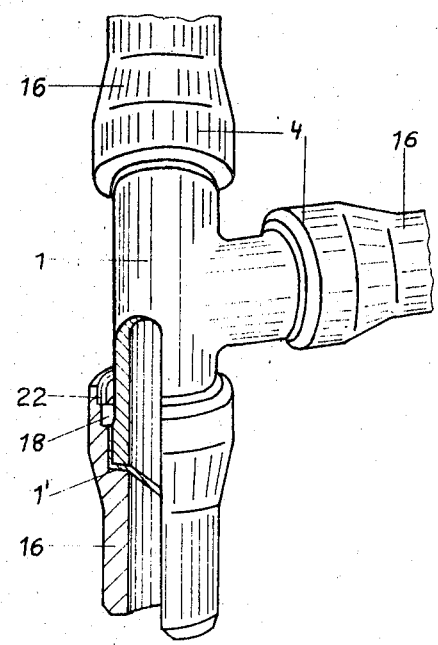
FIG. 5 shows form of pipe coupling in which the coupling member is constructed as T-junction piece, as a perspective view, partially sectioned.

FIGS. 5 illustrate a pipe coupling in which the coupling member 1 is constructed as a T-junction piece to which are connected sockets 4 of pipe sections 16. In this case the pipe joint is secured by a divided olive 18 and a compression ring 22 the latter having a bore corresponding to the diameter of the annular bead of the coupling member to enable it to be fitted over it before the olive 18 is fitted. Any disired albows, cross-pieces and reducers may be constructed in similar manner to receive attachments. The compression ring is threaded into the socket 4 as described with reference to FIG. 4.

FIG. 6 shows a pipe coupling in which a circular olive 23, comprising at least two part circular parts is forced into position and welded during installation in the socket 4 by welded seams 37. The bead 27 of the coupling member 1 with the protective film 2 is thus locked in the axial direction in the socket 4. Subsequently the sheath 34 is applied.

Also shown are longitudinal welding seams 36 which secure the two halves of the olive 36 together, and the circumferential weld seam 37 which hold the olive 23 in the socket 4. The bore of the olive is provided as far as a shoulder 55 with two diametrically opposed flats 51 which bear flats of the annular beads 27 of the coupling member 1. The space between the two olives is filled with an insulating foam substance 34, preferably polyurethane, after the olives are welded in position. The sockets 4 and the surface of the foam substance thus provide a uniform cylindrical external surface which permitted continuous lapping of the pipe coupling with a pipe insulating tape.

FIG. 7 shows one variation of the embodiment according to FIG. 6 in which the olive 24, in this case circular is slid over the annular bead 27 of the coupling member 21 before the socket 4 is applied. The olive 25 is held in the socket 4 by a circular weld seam 37 after it has been forced into positon, and is provided with serrations 38 for thrusting a second olive 18 against the bead 27. The second olive 18 is also serrated and is divided into at least two parts which are guided in a bore 39 of the socket 4 during assembly. Assembly is assisted by two compression rings 49 and 50 which are forced towards one another against the end of the socket 4 and the olive 25. The compression ring 49 may also function as mounting plate during assembly which is performed as follows.

For the assembling operation the socket 4, being already provided with the seal 3 which may be constructed of silicone rubber, is placed vertically on the ring 49 whereupon the internal surface of the socket which is to contact the bead 27 is coated with an adhesive substance, preferably a modified epoxy resin. The coupling member 1, the annular bead 27 of which is also coated with adhesive substance, is then inserted into the socket 4 together with the olives 24 and 18. To facilitate this operation the bore in the socket 4 is slightly tapered with a pitch of approximately 1°. The compression ring 50, which is of divided construction, is then placed on the olive 24 and the two compression rings 49 and 50 are thrust relatively towards each other. The welding seam 37 is applied while the pressure is maintained whereupon the pipe connection is pressure relieved and the compression rings 49 and 50 are removed. Any welding heat which has not been dissipated may be utilized for precuring any additional adhesive joining which may be provided, subsequent tapering ensuring rapid stabilization to assure maximum mechanical strength.

FIG. 8 relates to an embodiment in which the socket 4 is surrounded by a union sleeve 58 whose end nearest to the pipe section end 16, is secured, for example by welding against rotation and whose other end is internally screwthreaded at 54 to receive an externally threaded compression ring 55 which is screwed into position to thrust against the bead 27 of the coupling member 1. The ring 55 is formed by two annulii which are axially arranged and are joined to each other by means of grub screws 46. Finally the protective sheath.

Figure 9:
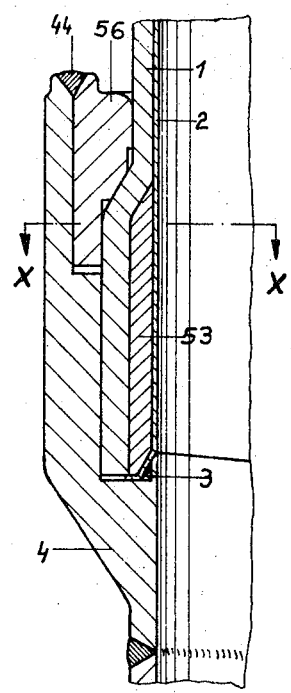
FIG. 9 shows one end of a further embodiment of coupling in longitudinal section.

FIG. 9 relates to an embodiment which is particularly suitable for installation in pipelines having very large nominal bores and high nominal pressures. In this embodiment an olive 56, divided into two parts, is held, after being forced into position, by a welding seam 44 on the radial end face of the socket 4.

The annular bead of the coupling member 1 in this embodiment is produced by forming it around a sleeve 53 which, at the end portion, it thus located between the reinforced layers of the coupling and the protective skin 2. The coupling member disposed between the two annular beads being then lapped with resin-impregnated reinforcing fibres such as are used to cover the sleeve 53.

The sleeve 53 may be constructed of different materials. For example, it may take form of a circumferential lapping on the protective skin 2, the same lapping material being preferably used as is used for cross-lapping over the sleeve 53 in the next operation. The sleeve may however also comprise a shaped member, for example of steel. It may also be a moulding of thermo-setting plastics which is reinforced with chopped high-tensile fibres. A coupling member constructed in this manner has a high mechanical strength and is therefore particularly suitable to function as a component of the pipe coupling.

Figure 11:
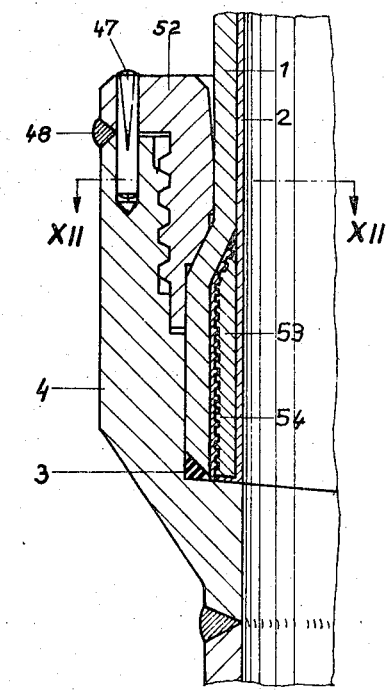
FIG. 11 shows an end of an embodiment of coupling with a divided compression ring and cotter pins.
Figure 10:
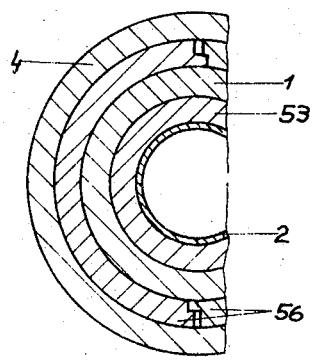
FIG. 10 is a section along the line X—X of FIG. 9 viewed in the direction indicated by the arrows.
Figure 12:
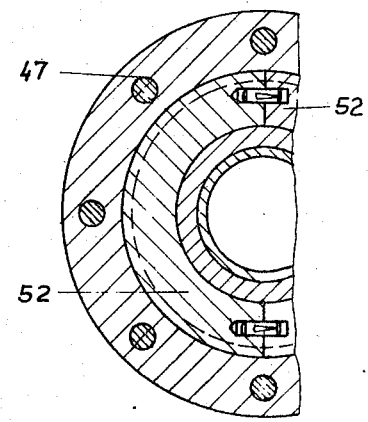
FIG. 12 is a section along the line XII—XII of FIG. 11 and in the direction indicated by the arrows.

In the embodiment according to FIG. 11 the annular bead of the coupling member 1 is formed around a metal sleeve 53, which is corrugated on its external surface, the sleeve being provided with a jointing layer 54, all parts being then lapped with a resin-impregnated wrapping of reinforcing fibres during the manufacture of the coupling member. A divided and externally threaded compression ring 52 is inserted into the socket 4 which is internally threaded, to bear against the sleeve 53. The compression ring is secured in its clamping position by cotter pins 47 and is then joined to the socket 4 by means of partial welding seams 48.

Figure 13:
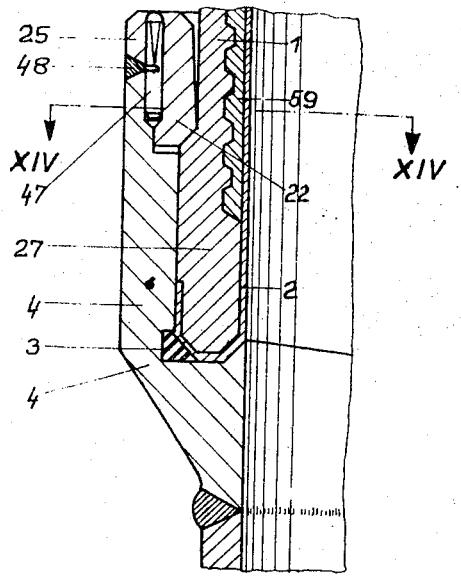
FIG. 13 shows, in section, part of a further embodiment of coupling having a reinforced coupling member.
Figure 14:
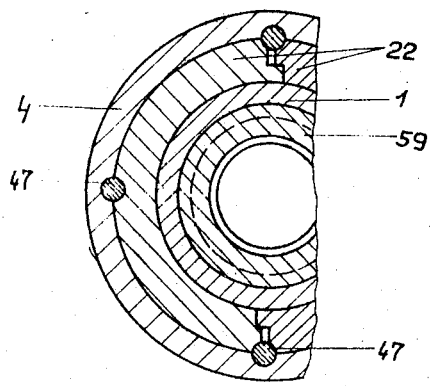
FIG. 14 is a section along the line XIV—XIV of FIG. 13 taken in the direction indicated by the arrows.

FIGS. 13 and 14 relates to an embodiment in which the inside of the coupling member 1 adjoins the protective skin 2 and has embedded in the interior face a finned reinforcing sleeve 59, for example of steel, which still further improves the mounting of the pipe coupling since it bridges the entire middle part of the coupling member between the sockets 4. The reinforcing sleeve 53 is joined to the coupling member wall of reinforced plastics by virtue of the wall being lapped on to the reinforcing sleeve and the skin 2 covers them both.

The coupling member 1 constructed in this manner is stressed in the socket 4 by means of a divided olive 22 which is driven into the socket 4 by cotter pins 47 and is then forced in position by welding the cotter pins as at 48.

This embodiment is suitable for use in pipelines having very large nominal bores (up to and exceeding 1,000 mm) and nominal pressures (up to and exceeding 100 atm gauge).

Figure 16:
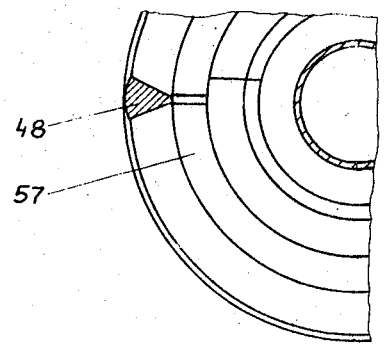
FIG. 16 is an end view of a welded compression arrangement used in the embodiment shown in FIG. 15.
Figure 15:
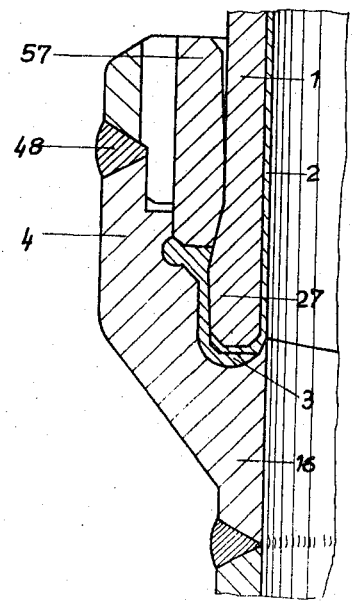
FIG. 15 shows, in section, part of one end of an embodiment of coupling with an integrally vulcanized annular bead and seal on the coupling member.

In the embodiment illustrated in FIGS. 15 and 16 the annular bead 27 of the coupling member 1 is vulcanized into a seal 3 of silicone rubber. The stressing member in this case consists of an olive 25, divided arcuately into two parts, the parts, being joined to each other and to the socket 4 by means of welding seams 48 after they have been forced into position.

What is claimed is:

1. An electrically insulating pipe coupling having two spaced pipe connections, a hollow electrically insulating coupling member extending between the pipe connections, each of which provides a socket member for receiving the coupling member, an external annular bearing surface on the coupling member and spaced back from the end rim, a stressing arrangement arranged to be guided axially by the socket member and provided with abutment means for bearing on the annular bearing surface of the coupling member to force the coupling member tightly into the socket member, and means maintaining the stressing arrangement rigidly attached to the socket member after the coupling member has been forced into sealing engagement with a sealing surface in the socket, the pipe coupling being so arranged that, when assembled between two metal pipes, no overlap occurs between metal parts of the coupling which are respectively electrically continuous with the two metal pipes.

2. A coupling as claimed in claim 1 in which the interior of the coupling member is covered throughout its length by a plastics liner.

3. A coupling as claimed in claim 1 in which the thickness of the end portions of the coupling member are enlarged to provide beads, each of which terminates in an annular shoulder providing the bearing surface.

4. A coupling as claimed in claim 2 in which the rim and outer surface of the coupling member have a hard metal sheath.

5. A coupling as claimed in claim 2 in which the liner extends over the rim and outer surface of the spigot end portion of the coupling member.

6. A coupling as claimed in claim 1 in which the sealing surface at the end of the socket comprises a resiliently deformable electrically insulative sealing ring located in an annular recess at the end of the socket.

7. A coupling as claimed in claim 1 in which the sealing surface at the end of the socket is provided by a liquid filled resilient tube lying in an annular recess at the end of the socket.

8. A coupling as claimed in claim 1 in which the socket end portions of the coupling member have embedded in them hard metal cylindrical stiffeners.

9. A coupling as claimed in claim 1 in which the coupling member is formed by superimposed bonded-together turns of a wrapping of reinforced plastics material.

10. A coupling as claimed in claim 1 in which each pipe coupling comprises a metal pipe section having its end portion surrounding the socket of larger diameter than its other end which is for welding to a pipe and has the same internal diameter as the coupling member.

11. A coupling as claimed in claim 1 in the rim of the coupling member lies in a plane which is inclined to the longitudinal axis of the coupling member.

12. A coupling as claimed in claim 9 in which the turns are wrapped around a plastic cylindrical shell lying in an end portion of the coupling member.

13. A coupling as claimed in claim 1 in which the stressing arrangement comprises a force-transmitting part providing the abutment, means and a separate force-exerting part which is tightened up on the socket member during assembly.

14. A coupling as claimed in claim 13 in which the force-transmitting part comprises a ring of arcuately spaced stressing pins in thy socket member, each pin lying in a recess and bearing at one end on an enlarged end portion of the coupling member and engaged at the other end by the force-exerting part.

15. A coupling as claimed in claim 13 in which the force-transmitting part comprises an annular compression ring.

16. A coupling as claimed in claim 15 in which the ring is in arcuate sections for fitting around the coupling member.

17. A coupling as claimed in claim 16 including radial adjusting screws extending through the socket member from the ring sections.

18. A coupling as claimed in claim 13 in which the force-exerting member comprises a threaded compression ring whose threads cooperate with threads on the socket member.

19. A coupling as claimed in claim 18 in which the compression ring is internally threaded for screwing onto the socket member and has an inwardly turned flange which engages the force-transmitting part.

20. A coupling as claimed in claim 18 in which the compression ring is externally threaded for screwing into a threaded annulus in the socket member.

21. A coupling as claimed in claim 13 in which the force-transmitting part comprises a compression ring coaxially arranged around the coupling member and the force-exerting part comprises bolts extending through the socket member from the compression ring equipped with tighteninng nuts.

22. A coupling as claimed in claim 1 in which the stressing arrangement comprises a ring forced into position by metal parts which are thereafter welded to the socket member.

23. A coupling as claimed in claim 22 in which the metal parts are welded additionally to the ring which is assembled from ring sections.

24. A coupling as claimed in claim 1 in which the stressing arrangement comprises wedges held in position by an outer shell bolted together around the outside of each pipe connection and provided with stressing ring and circlips around its opposite openings.

25. A coupling as claimed in clam 1 in which the stressing arrangement includes dowel pins arranged at arcuately spaced intervals around the socket member which are driven into position and then held in place by welds.

26. A coupling as claimed in claim 1 in which the elements comprise openings for the reception of weld metal.

27. A coupling as claimed in claim 1 in which the elements comprise threads on the socket member onto which is heat-shrunk a ring providing part of the stressing arrangement.

28. A coupling as claimed in claim 1 in which the elements comprise lock nuts.

29. A coupling as claimed in claim 1 in which the intermediate portion of the coupling member between the two socket members is covered with a sheath of a shock-absorbing material.

30. A coupling as claimed in claim 29 in which the sheath is an ethylene copolymer bitumen mixture.

31. A pipe coupling as claimed in claim 1 in which the axis of the pipe connections is transversely arranged.

32. A pipe coupling as claimed in claim 7 in which the tube is silicone rubber and the liquid is glycerine.

33. A coupling as claimed in claim 6 in which the sealing ring is provided by filling an annular chamber disposed between the spigot rim and the socket member with a casting of a material which remains plastic.

34. A coupling as claimed in claim 33 in which the material is a polyester urethane mixture.

35. A coupling as claimed in claim 6 in which the ring is made of polytetrafluoroethytene.

36. A coupling as claimed in claim 13 in which the force-exerting part comprises a ring having one annular face serrated and of larger internal diameter than the external diameter of the end portion of the coupling member, and the force-transmittting part comprises a two-part circular ring having its annular end facing the first ring also serrated and providing the abutment means.

37. A coupling as claimed in claim 1 in which the bearing surface of the coupling member is provided by a ring which extends around the coupling member and is embedded in its external surface.

38. A coupling as claimed in claim 14 in which the socket member is screw-threaded onto a pipe end and means are provided to prevent their relative rotation.

* * * * *